(No Model.)

G. W. DOLBY.
BRAKE FOR BABY CARRIAGES.

No. 420,230. Patented Jan. 28, 1890.

WITNESSES:
J. H. Clark
C. Sedgwick

INVENTOR:
G. W. Dolby
BY Munn & Co.
ATTORNEYS.

UNITED STATES PATENT OFFICE.

GEORGE W. DOLBY, OF TREMONT, NEW YORK.

BRAKE FOR BABY-CARRIAGES.

SPECIFICATION forming part of Letters Patent No. 420,230, dated January 28, 1890.

Application filed May 18, 1889. Serial No. 311,298. (No model.)

*To all whom it may concern:*

Be it known that I, GEORGE W. DOLBY, of Tremont, in the county and State of New York, have invented a new and useful Improvement in Brakes for Baby-Carriages, of which the following is a full, clear, and exact description.

My invention relates to an improvement in brakes for baby-carriages, and has for its object to provide a brake of simple and economical construction, and which may be expeditiously and conveniently applied to a wheel.

A further object of the invention is to provide a brake which when applied to a wheel will effectually prevent the vehicle from moving any great distance even upon an inclined surface.

The invention consists in the novel construction and combination of the several parts, as will be hereinafter more fully set forth, and pointed out in the claims.

Reference is to be had to the accompanying drawings, forming a part of this specification, in which similar letters and figures of reference indicate corresponding parts in both the views.

Figure 1:
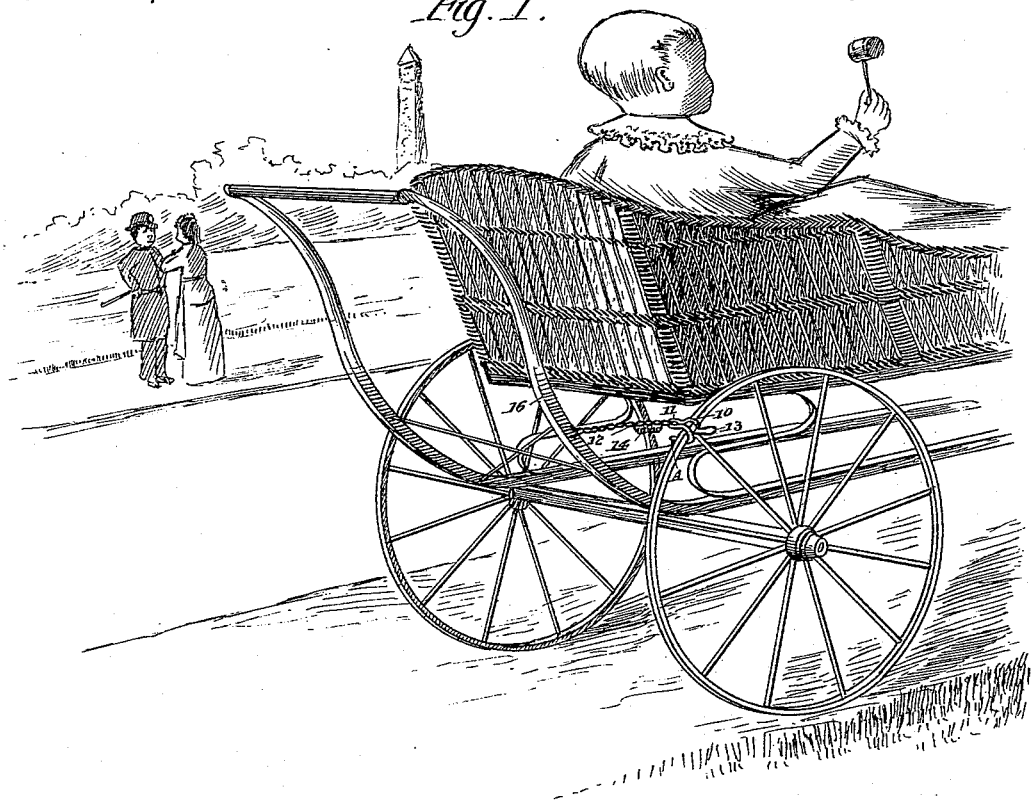
Figure 2:
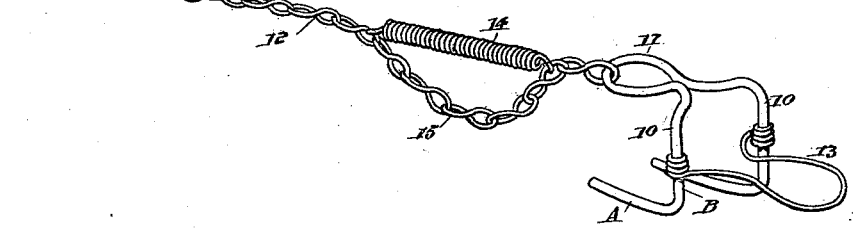

Figure 1 illustrates the application of the device, and Fig. 2 is an enlarged perspective view of the same detached.

The body of the device is preferably constructed of wire bent upon itself to form two parallel or twin hooks 10, having a common shank 11, which shank is ordinarily made in loop form to receive one end of a chain 12 or its equivalent, such as a rope or cord. The chain, however, is preferred. In forming the hook 10 the horizontal member A of each hook is carried preferably in the direction of the shank, at a right angle to the vertical member B.

For convenience in manipulating the brake, I ordinarily and preferably attach to the vertical member of the hooks a handle 13, extending horizontally outward, as illustrated in Fig. 2. This handle may be of any approved construction, but usually consists of a piece of wire bent to the proper shape.

When a chain 12 is employed in connection with the body of the brake, two links of the chain are secured to a spring 14, the links to which the spring is connected being such a distance apart as to produce a loop or sag 15 in the length of the chain, as is also best illustrated in Fig. 2. The free end of the chain is attached to one of the side bars of the carriage-handle 16, either through the medium of a staple, as shown, or by locking the chain around the handle, in which latter event it is prevented from falling too low by passing a pin through the handle beneath the lap in the chain.

In operation, when it is desired to brake the wheel of a carriage in order to enable the attendant to leave the same without danger of the position of the carriage being changed, the hooks 10 are made to contact with the felly of the wheel, the shank passing over the tire and the horizontal member of the hooks beneath the felly, as illustrated in Fig. 1, the brake being applied to the wheel in such manner that one of the hooks will pass at each side of the spoke.

The chain is of such length that in order to place the brake upon the wheel the spring 14 is elongated. Thus the hooks are effectually prevented from slipping off from the wheel when placed in contact therewith. The handle 13 is adapted to enable the operator to place the brake in position without soiling the hands.

Having thus described my invention, I claim as new and desire to secure by Letters Patent—

1. A brake for baby-carriages consisting of a rope or chain adapted to be secured to the handles of the carriage, twin hooks for engaging the felly of the wheel, having a common shank and secured to the rope or chain, and a spring secured to the rope or chain looping a portion of the same, substantially as described.

2. In a brake for baby-carriages, the combination, with twin hooks having a common shank, the shank extending, essentially, parallel with the horizontal member of the hooks, of a rope or chain attached to said shank, a spring secured to the said rope or chain producing a loop-section in the length of the latter, and a handle secured to the vertical member of the said hooks, as and for the purpose specified.

GEORGE W. DOLBY.

Witnesses:
MARY A. DOLBY,
JOHN P. SANCHES.